Patented Aug. 25, 1942

2,293,877

UNITED STATES PATENT OFFICE 2,293,877

AMINO COMPOUND

Eugene H. Woodruff, Kalamazoo, Mich., assignor to The Upjohn Company, Kalamazoo, Mich.

No Drawing. Application May 25, 1939,
Serial No. 275,641

3 Claims. (Cl. 260—570.8)

This invention relates to improvements in amino compounds.

This invention relates to a new and useful product which is physiologically active and capable of producing pressor effects in treating engorged nasal mucosa. The product is particularly useful in shrinking engorged nasal mucosa because of its great pressor effect and relatively low toxicity when compared with the pressor effect. Its bronchodilator effect is nil.

The objects of the invention are:

First, to produce a new and useful product.

Second, to produce such a product which is physiologically active as a therapeutic agent for treating engorged nasal mucosa.

Third, to produce such a product in which the relationship between physiological activity and toxicity is such that in therapeutic doses the toxicity is relatively lower than that in similar substances.

Fourth, to produce such a substance which may be administered by local application.

Other objects and advantages will appear from the description to follow. The invention is defined in the claims.

My new product may be termed β-3,4-dihydroxyphenyl - n - propylamine. The structural formula is as follows:

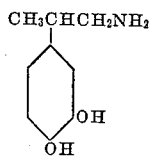

I produce it in the following manner:

Ethyl-(β-methyl)-3,4 dimethoxy cinnamate is produced as follows:

89 grams (0.5 mole) of 3,4 dimethoxy acetophenone, 100 grams (0.6 mole) ethyl bromacetate, 50 grams of zinc-copper alloy shavings (8 per cent copper) and 250 cc. of anhydrous benzene are placed in a one-liter round-bottomed flask equipped with a reflux condenser. The reactants are heated on a steam bath until a vigorous reaction sets in whereupon the heat is withdrawn until the violence has subsided. The solution is then refluxed an additional 45 minutes to complete the reaction.

After cooling the zinc complex is decomposed by adding a large excess of cold dilute sulfuric acid. The solution is then filtered with suction to remove any undissolved zinc and copper. The orange colored benzene solution is separated from the aqueous layer and dried over anhydrous magnesium sulfate.

The dried benzene solution is refluxed for 30 minutes with 30 cc. of phosphorous oxychloride in a one-liter round-bottomed flask. The cooled deeply colored solution is washed twice with cold water to remove the phosphorous oxychloride and then dried over anhydrous magnesium sulfate. After removal of the solvent the product is distilled under reduced pressure. This product has a boiling point of 145–8° at 90 mm. of mercury. This yields 94 grams or 75 per cent of the theoretical.

3.4 dimethoxy-β-methyl cinnamic acid is then formed from this product as follows:

125 grams (0.5 mole) of the ester is saponified by refluxing for two hours with 56 grams (1 mole) of potassium hydroxide made up to a 50 per cent solution, enough alcohol being added to completely dissolve the ester. After refluxing for two hours the solution is poured into two liters of water. The alcohol is removed under diminished pressure and the cooled alcohol-free solution extracted with ether to remove unsaponified material. After expelling the ether the solution is acidified with concentrated hydrochloric acid. The acid may be recrystallized from a benzene-petroleum ether mixture, and has a melting point of 138–140°.

β-(3,4-dimethoxy phenyl) butyric acid is then formed from this product as follows:

222 grams (1.0 mole) of o-methoxy-β-methyl cinnamic acid is added to two liters of 8 per cent sodium sulfate solution containing 20 grams of sodium hydroxide. The solution is reduced electrolytically using a mercury cathode and a sheet lead anode. An apparatus that may be used for amounts of this size is described in "Organic Synthesis," col. vol. I, p. 304, H. Gilman, editor, John Wiley & Sons, N. Y.

60.0 ampere hours are used for reduction, this being about 10 per cent in excess of the amount theoretically necessary. The solution in the cathode compartment is filtered and acidified with sulfuric acid. Upon recrystallization from benzene-petroleum ether a solid melting point of 86–7° is obtained. This yields 213 grams or 95 per cent of the distilled material.

β-(3,4-dimethoxy phenyl) butyryl chloride is then formed from this product as follows:

To 180 grams (1.5 mole) of thionyl chloride contained in a one-liter round-bottomed flask equipped with a reflux condenser and an efficient gas absorption trap is dropped over ¾ hour 224 grams (1.0 mole) of β-(3,4-dimethoxy phenyl)

butyric acid dissolved in chloroform. The flask is warmed gently on a steam bath during the addition of the acid and for one-half hour longer. The acid chloride does not distill and is used without isolation in the next step.

β-(o-Methoxy phenyl) butyramide is then formed from this product as follows:

1500 cc. of 27 per cent ammonia water is placed in a 5-liter three-necked flask equipped with a mechanical stirrer and cooled to +10° C. by means of an ice-salt mixture. To the ice cold ammonia 242.5 grams (1.0 mole) of β-(3,4 dimethoxy phenyl) butyryl chloride in chloroform is added at such a rate as to keep the temperature of the solution at +10 to +15° C. Gaseous NH₃ is bubbled into the solution at the same time so as to keep the aqueous solution saturated with the gas during the reaction. The solution is stirred 30 minutes after the addition of the acid chloride and is then extracted with more chloroform to remove the amide. The chloroform is removed by distillation. The yield is 200 grams or 90 per cent of the theoretical. The amide may be crystallized from benzene and has a melting point of 131° C.

β-3,4-dimethoxy phenyl-n-propyl amine is then formed from this product as follows:

In a 2-liter three-necked round-bottomed flash equipped with a thermometer and a mechanical stirrer is placed 80 grams of sodium hydroxide dissolved in 800 cc. of distilled water and 88 grams of liquid bromine. The solution is cooled to 15–20° C. and 111.5 grams (0.5 mole) β-(3,4-dimethoxy phenyl) butyramide ground to pass a 20 mesh sieve is dusted over the surface of the stirred solution as fast as it will dissolve.

When the amide is in solution an air-cooled condenser is added and the solution warmed to 70° for one hour. Eighty grams of solid sodium hydroxide are added and the solution heated with stirring at 80° for one and one-half hours. Upon cooling the oil is extracted from the aqueous solution with ether, dried over anhydrous magnesium sulfate and on removal of the solvent vacuum distilled. This product has a boiling point of 160° at 14 mm. of mercury. This yields 71 grams or 74 per cent of the theoretical.

β-3,4-dimethoxy phenyl-n-propylamine is then formed from this product as follows:

9.75 grams (0.05 mole) of the methoxy amine and 45 cc. of 36 per cent hydrochloric acid are heated in a sealed tube at 160° C. for two hours. After cooling the tube is opened and the contents removed and upon evaporation of the filtrate 9.0 grams of material may be obtained. When further purified by crystallization from an absolute alcohol-ether mixture the hydrochloride melts at 180° C.

The free amine may be employed. It is obtained by treatment of the chloride with ammonia in the recognized manner.

This product has a pressor effect 1/40 that of epinephrine. It has no noticeable bronchodilator effect. Its toxicity is such that 40 mg. per kilo body weight will kill 50% of the rats to which the substance is administered.

The substance is particularly useful in treating engorged nasal mucosa. It is much more active as a pressor than the commonly used α-methyl-β-phenethylamine which is commonly used as a pressor and in therapeutic doses its toxicity is relatively much smaller, making it a very safe product for therapeutic use.

The substance is applied locally in a solution in oil or other suitable solvent. The free amine may be employed or in addition other hydrochloride salts of inorganic mineral acids such as sulfuric and phosphoric may be used. If desired, salts of carboxylic acids may be employed and if salts of heavy organic acids such as oleic, stearic and palmitic are employed, these salts are particularly adaptable for dissolution in mineral oil.

In employing this substance I have found that the pressor effect is of much longer duration than that of epinephrine, making the substance particularly useful for practical applications.

Having thus described my invention, what I claim as new and desire to secure by Letters Patent is:

1. A salt of β-3,4-dihydroxyphenyl-n-propylamine having a pressor effect about 1/40 that of epinephrine.

2. β-3,4-dihydroxyphenyl-n-propylamine having a pressor effect about 1/40 that of epinephrine.

3. A salt of an acid selected from a group consisting of inorganic mineral acids, organic carboxylic acids and β-3,4-dihydroxyphenyl-n-propylamine having a pressor effect about 1/40 that of epinephrine.

EUGENE H. WOODRUFF.